United States Patent [19]

Blackman et al.

[11] Patent Number: 5,737,597
[45] Date of Patent: Apr. 7, 1998

[54] METHOD FOR CATALOGING DATASTORE CHARACTERISTICS AND DEFINING AND GENERATING DATASTORE PERSISTENT OBJECTS

[75] Inventors: Kenneth R. Blackman, San Jose; Jack L. Howe, III, Gilroy, both of Calif.

[73] Assignee: International Business Machines Corporation, Armonk, N.Y.

[21] Appl. No.: 736,765

[22] Filed: Oct. 25, 1996

[51] Int. Cl.$^6$ .................................................. G06F 17/30
[52] U.S. Cl. ............................................ 395/613; 395/614
[58] Field of Search ...................................... 395/601, 611, 395/613, 614, 702

[56] References Cited

U.S. PATENT DOCUMENTS

| | | | |
|---|---|---|---|
| 5,161,225 | 11/1992 | Abraham et al. | 395/614 |
| 5,212,787 | 5/1993 | Baker et al. | 395/612 |
| 5,235,701 | 8/1993 | Ohler et al. | 395/601 |
| 5,291,583 | 3/1994 | Bapat | 395/500 |
| 5,295,256 | 3/1994 | Bapat | 395/500 |
| 5,297,279 | 3/1994 | Bannon et al. | 395/614 |
| 5,303,379 | 4/1994 | Khoyi et al. | 395/710 |
| 5,379,419 | 1/1995 | Heffernan et al. | 395/604 |
| 5,414,812 | 5/1995 | Filip et al. | 395/614 |
| 5,421,015 | 5/1995 | Khoyi et al. | 395/677 |
| 5,426,747 | 6/1995 | Weinreb et al. | 395/413 |
| 5,437,027 | 7/1995 | Bannon et al. | 395/614 |
| 5,459,860 | 10/1995 | Burnett et al. | 395/612 |
| 5,499,371 | 3/1996 | Henninger et al. | 395/702 |
| 5,542,078 | 7/1996 | Mantel et al. | 395/612 |
| 5,581,756 | 12/1996 | Nakabayashi | 395/602 |
| 5,613,099 | 3/1997 | Erickson et al. | 395/500 |
| 5,627,979 | 5/1997 | Chang et al. | 395/335 |

OTHER PUBLICATIONS

Kenneth J. Muckenhaupt, "Preserving Current Assets With Objects on MVS White Paper," Mar. 15, 1996, at http://www.s390.ibm.com/products/wp/wrapwp.html.

"The Essential Distributed Objects Survival Guide—Chapter 8 CORBA Services: Persistence and Object Databases," at http://koh.kyungpook.ac.kr/members/gwh/ai8.html, date unknown.

"IMS in an Object Oriented World", IBM Corporation, San Jose, CA, Jul. 12, 1995, pp. 1–53.

Jack L. Howe, III, IMS/OO—Overview: Objects in IMS Are Closer Than They Appear", IBM Corporation, overheads from presentation at Share 95, Feb. 23, 1995.

Jack L. Howe, III, "Objects in the IMS are Closer Than They Appear", IBM Corporation, overheads from presentation at IBM Technical Interchange '95, May 20, 1995.

"Voyager/C++ Client/Server Object Management System", Secant Technologies Inc., 1995.

Primary Examiner—Paul V. Kulik
Attorney, Agent, or Firm—Merchant, Gould, Smith, Edell, Welter & Schmidt

[57] ABSTRACT

A method, apparatus, and article of manufacture for cataloging datastore characteristics and defining and generating datastore persistent objects. A computerized system includes an external non-object-oriented datastore and a class definition tool that defines a specification for the external non-object-oriented datastore, defines a specification for a datastore persistent object class using the specification for the external non-object-oriented datastore, and defines a specification for an application program that interacts with the datastore persistent object class. The class definition tool stores the datastore specification, the datastore persistent object class specification, and the application program specification in a catalog. The class definition tool further uses the datastore specification and the datastore persistent object class specification to generate datastore persistent object class and schema mapper class definition and method source code, and uses the application program specification to generate subschema mapper class definition and method source code.

42 Claims, 6 Drawing Sheets

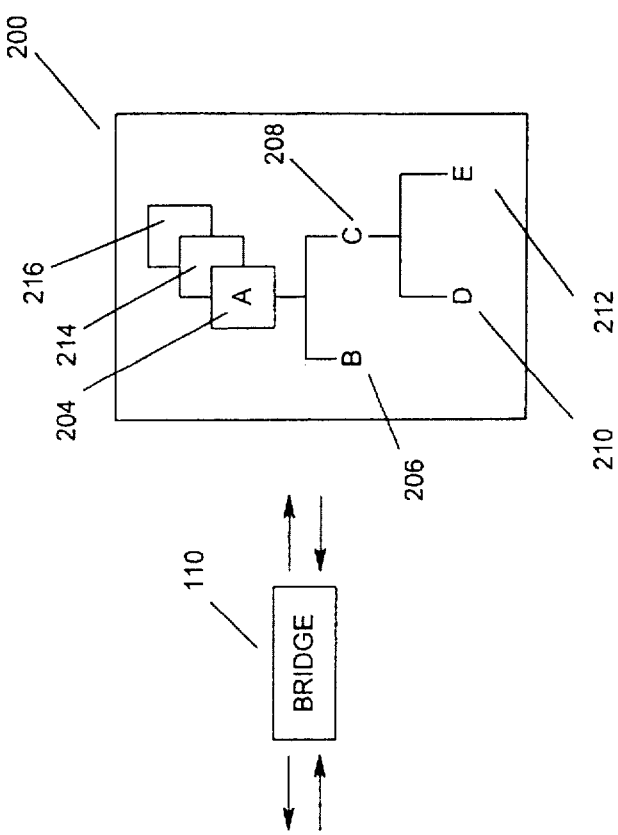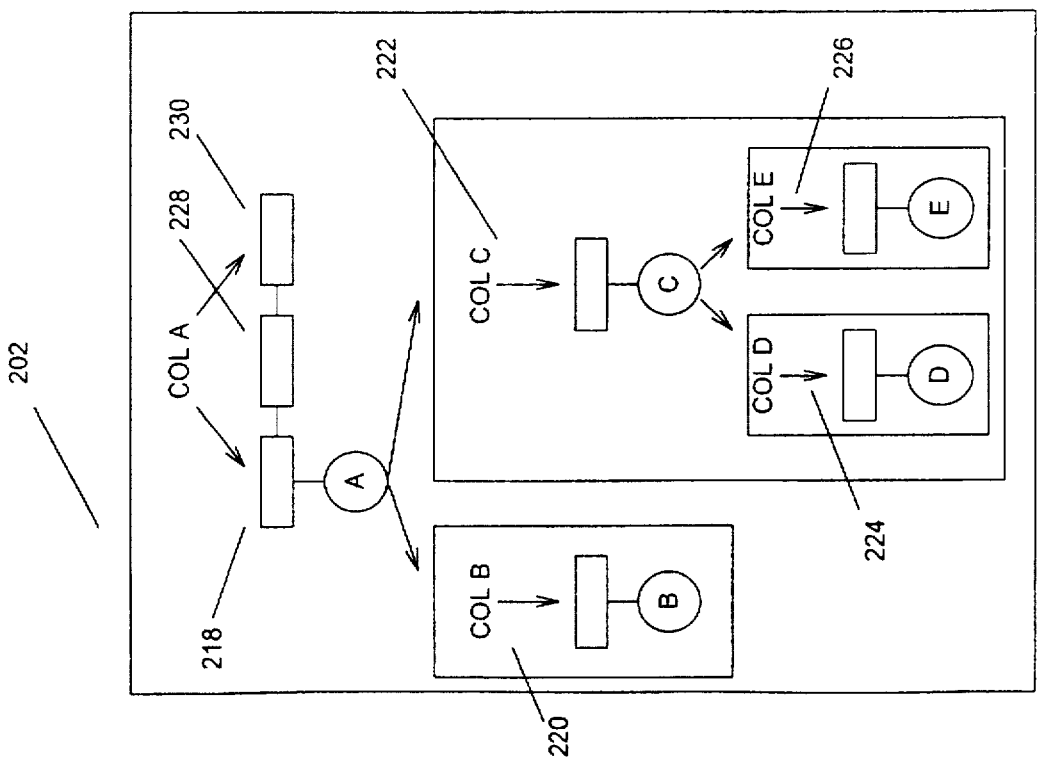
FIG. 2

METHOD FOR CATALOGING DATASTORE CHARACTERISTICS AND DEFINING AND GENERATING DATASTORE PERSISTENT OBJECTS

CROSS-REFERENCE TO RELATED APPLICATIONS

This application is related to the following co-pending and commonly-assigned patent applications:

application Ser. No. 08/736,762, entitled "A FRAMEWORK FOR OBJECT-ORIENTED ACCESS TO NON-OBJECT-ORIENTED DATASTORES," filed on same date herewith, by Kenneth R. Blackman and Jack L. Howe III;

application Ser. No. 08/736,763, entitled "A METHOD FOR REPRESENTING NON-OBJECT-ORIENTED DATASTORES USING A COLLECTION OF COLLECTIONS DATA MODEL," filed on same date herewith, by Kenneth R. Blackman and Jack L. Howe III;

application Ser. No. 08/738,294, entitled "A METHOD FOR THE INCREMENTAL PRESENTATION OF NON-OBJECT-ORIENTED DATASTORES USING AN OBJECT-ORIENTED QUERYABLE DATASTORE COLLECTION," filed on same date herewith, by Kenneth R. Blackman and Jack L. Howe III;

application Ser. No. 08/738,104, entitled "A QUERY SYNTAX FOR ACCESSING NON-RELATIONAL, NON-OBJECT-ORIENTED DATASTORES," filed on same date herewith, by Kenneth R. Blackman and Jack L. Howe III;

application Ser. No. 08/738,082, entitled "A QUERY PARSER FOR ACCESSING NON-RELATIONAL, NON-OBJECT-ORIENTED DATASTORES," filed on same date herewith, by Kenneth R. Blackman and Jack L. Howe III;

application Ser. No. 08/738,330, entitled "A METHOD FOR USING A DATASTORE CURSOR FOR THE INCREMENTAL PRESENTATION OF QUERY RESULTS WHEN TRAVERSING IMPLIED COLLECTIONS IN NON-OBJECT-ORIENTED DATASTORES," filed on same date herewith, by Kenneth R. Blackman and Jack L. Howe III;

application Ser. No. 08/736,759, entitled "A METHOD FOR REPRESENTING DATA FROM NON-RELATIONAL, NON-OBJECT-ORIENTED DATASTORES AS QUERYABLE DATASTORE PERSISTENT OBJECTS," filed on same date herewith, by Kenneth R. Blackman and Jack L. Howe III;

application Ser. No. 08/736,764, entitled "A METHOD FOR ENCAPSULATING DATA FROM NON-OBJECT-ORIENTED DATASTORES AS DATASTORE PERSISTENT OBJECTS," filed on same date herewith, by Kenneth R. Blackman and Jack L. Howe III;

application Ser. No. 08/738,103, entitled "A METHOD USING QUERYABLE PERSISTENT IDENTIFIERS TO LOCATE DATA FOR DATASTORE PERSISTENT OBJECTS IN NON-OBJECT-ORIENTED DATASTORES," filed on same date herewith, by Kenneth R. Blackman and Jack L. Howe III;

application Ser. No. 08/736,983, entitled "A METHOD FOR INTERFACING QUERYABLE DATASTORE PERSISTENT OBJECTS TO NON-RELATIONAL, NON-OBJECT-ORIENTED DATASTORES," filed on same date herewith, by Kenneth R. Blackman and Jack L. Howe III;

application Ser. No. 08/736,952, entitled "A METHOD FOR MANAGING QUERYABLE DATASTORE PERSISTENT OBJECTS AND QUERYABLE DATASTORE COLLECTIONS IN AN OBJECT-ORIENTED ENVIRONMENT," filed on same date herewith, by Kenneth R. Blackman and Jack L. Howe III;

application Ser. No. 08/738,102, entitled "A METHOD FOR CAPTURING AND CATALOGING SPECIFICATIONS FOR DATASTORE PERSISTENT CLASSES," filed on same date herewith, by Kenneth R. Blackman and Jack L. Howe III;

application Ser. No. 08/736,761, entitled "A METHOD FOR CAPTURING AND CATALOGING PROGRAM CHARACTERISTICS FOR THE USAGE OF DATASTORE PERSISTENT CLASSES," filed on same date herewith, by Kenneth R. Blackman and Jack L. Howe III; and application Ser. No. 08/738,105, entitled "A METHOD FOR USING A NON-OBJECT-ORIENTED DATASTORE AS A GENERIC PERSISTENT DATASTORE FOR PERSISTENT OBJECTS," filed on same date herewith, by Kenneth R. Blackman and Jack L. Howe III;

all of which applications are incorporated by reference herein.

BACKGROUND OF THE INVENTION

1. Field of the Invention

The present invention relates generally to computerized methods for accessing datastores, and in particular, to a computerized object-oriented method for accessing non-object-oriented datastores.

2. Description of Related Art

It is well known in the art to use database management systems, such as IBM's IMS™ (information Management System) database management system, to manage computerized datastores. Indeed, IMS™ has been used for decades and remains in use today. Currently, there is a need to access such "legacy" datastores using application programs developed by object-oriented programming systems (OOPS). However, there are few tools available to assist OOPS programmers.

For object-oriented applications to access non-object-oriented datastores, OOPS programmers often need to generate much code to satisfy the constraints of the object-oriented application, the non-object-oriented datastore, and the particular needs of the user. Thus, there is a need in the art for improved tools to facilitate bridging between non-object-oriented datastores and object-oriented application programs and to minimize the need to write to code for accessing the external datastore.

SUMMARY OF THE INVENTION

To overcome the limitations in the prior art described above, and to overcome other limitations that will become apparent upon reading and understanding the present specification, the present invention discloses a method, apparatus, and article of manufacture for cataloging datastore characteristics and defining and generating datastore persistent objects. A computerized system in accordance with the principles of the present invention includes an external non-object-oriented datastore and a class definition tool that defines a specification for the external non-object-oriented datastore, defines a specification for a datastore persistent object class using the specification for the external non-object-oriented datastore, and defines a specification for an application program that interacts with the datastore persistent object class.

The class definition tool stores the datastore specification, the datastore persistent object class specification, and the application program specification in a catalog.

The class definition tool further uses the datastore specification and the datastore persistent object class specification to generate datastore persistent object class and schema mapper class definition and method source code, and uses the application program specification to generate subschema mapper class definition and method source code.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a block diagram illustrating a collection of collections data model according to the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Overview The present invention catalogs datastore characteristics and defines and generates code for datastore persistent objects. A computerized system in accordance with the principles of the present invention includes an external non-object-oriented datastore and a class definition tool that defines a specification for the external non-object-oriented datastore, defines a specification for a datastore persistent object class using the specification for the external non-object-oriented datastore, and defines a specification for an application program that interacts with the datastore persistent object class.

The class definition tool stores the datastore specification, the datastore persistent object class specification, and the application program specification in a catalog. The class definition tool further uses the datastore specification and the datastore persistent object class specification to generate datastore persistent object class and schema mapper class definition and method source code, and uses the application program specification to generate subschema mapper class and method source code.

Hardware Environment

Figure 1:
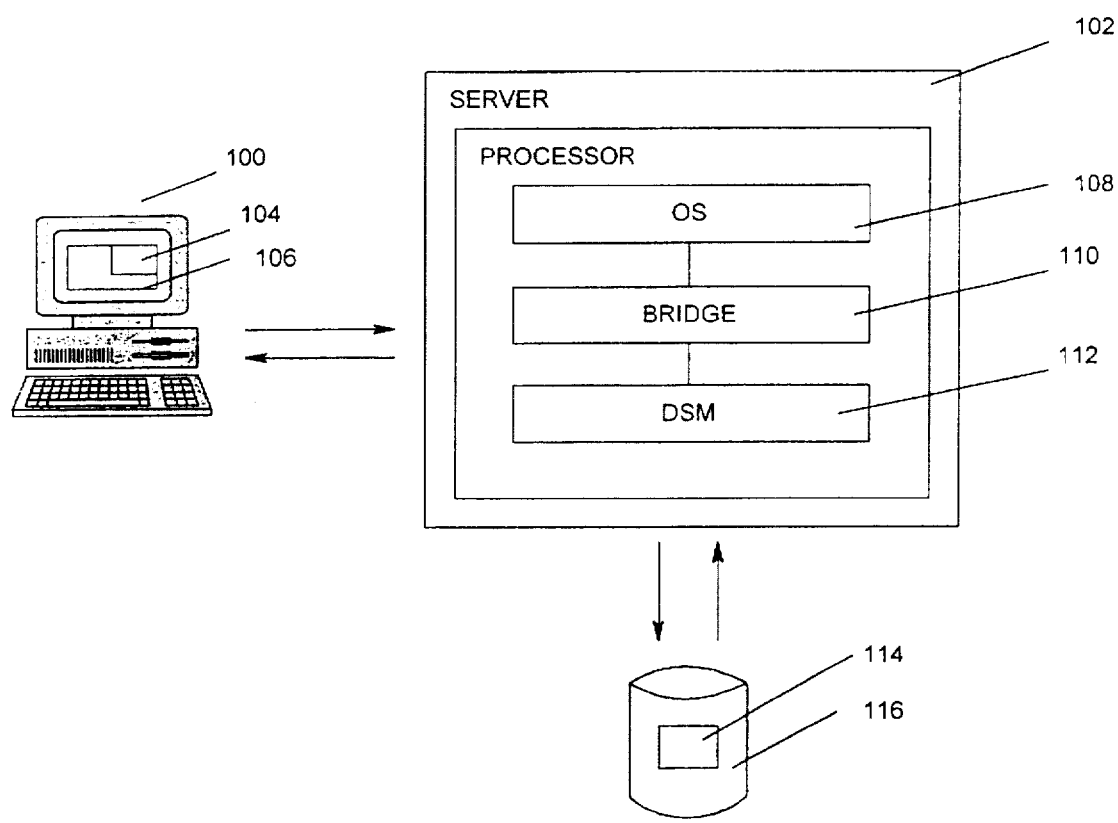
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A workstation or terminal 100 communicates with a server computer 102. Both the workstation 100 and the server computer 102 are typically comprised of one or more processors, random access memory (RAM), read-only memory (ROM), and other components such as data storage devices and data communications devices.

The workstation 100 executes one or more computer programs 104 operating under the control of an operating system 106, such as the MVS™, VM™, AIX™, OS/2™, Windows™, Macintosh™, AS/400™, or UNIX™ operating systems. These computer programs 104 transmit commands to the server computer 102 for performing various functions and receive data from the server computer 102 in response to the commands.

The server computer 102 also operates under the control of an operating system 108, such as the MVS™, VM™, AIX™, OS/2™; Windows™, Macintosh™, AS/400™, or UNIX™ operating systems. The server computer 102 executes one or more computer programs 110 and 112 under the control of the operating system 108. These computer programs 110 and 112 receive commands from the workstation 100 for performing various functions and transmit data to the workstations 100 in response to the commands.

The server computer 102 manages one or more external databases or datastores 114 stored on one or more data storage devices 116 (such as a fixed or hard disk drive, a floppy disk drive, a CD-ROM drive, a tape drive, or other device). In the preferred embodiment, the external datastore 114 comprises an IMS™ datastore managed by an IMS™ database management system (DBMS) product offered by IBM Corporation. Those skilled in the art will recognize, however, that the present invention may be applied to any datastore and associated database management system.

The present invention is generally implemented using five major components executed by the workstation 100 and the server computer 102, i.e., object-oriented application program 104, workstation operating system 106, server operating system 108, bridge 110, and datastore manager (DSM) 112, wherein each of these components comprise one or computer programs. The object-oriented application program 104 performs application functions; the workstation operating system 106 controls the operation of the workstation 100; the server operating system 108 controls the operation of the server computer 102; the bridge 110 materializes data retrieved from the external database 114 as objects; and the datastore manager 112 controls access to the external database 114.

Generally, these computer programs 104–112 are all tangibly embodied in or retrievable from a computer-readable medium, e.g., a data storage device or a data communications device. Moreover, the computer programs are all comprised of instructions which, when read and executed by the workstation 100 and/or server computer 102, causes the workstation 100 and/or server computer 102 to perform the steps necessary to implement and/or use the present invention.

Those skilled in the art will recognize that any combination of the above components, or any number of different components, including computer programs, peripherals, and other devices, may be used to implement the present invention, so long as similar functions are performed thereby.

Datastore Model

FIG. 2 is a block diagram illustrating the collection of collections data model used in the present invention. Data retrieved from the non-object-oriented external datastore 114 is modeled as a "collection of object collections" in the bridge 110. Where the external data has a simple structure, each record is encapsulated as an object, which becomes a member of an object collection. Where the records are hierarchical in structure, that hierarchical structure is modeled by creating object collections and then hierarchically connecting the related object collections. Other complex logical records can be modeled as a hierarchy of object collections. A single collection of collections is materialized for each datastore, e.g., the object model of two flat files is a model having two collections of collections.

Block 200 represents the logical hierarchical structure of the data as stored in the external datastore 114, and block 202 represents the logical "collection of object collections" structure created from the data retrieved from the external datastore 114. The bridge 110 translates the data between the differing formats and structures in blocks 200 and 202.

In the logical hierarchical structure of block 200, parent record A (204) has children records B (206) and C (208), and child record C (208) is also a parent of children records D (210) and E (212). There may also be multiple instances of parent record A (214 and 216).

Similarly, in the logical "collection of object collections" structure of block 202, parent object A (218) has children objects B (220) and C (222), and child object C (222) is also a parent of children objects D (224) and E (226). Further, there are multiple instances of parent object A (228 and 230). Each of these objects is a datastore persistent object (DPO) that encapsulates a logical unit of data, i.e., record, retrieved from the non-object-oriented datastore, and includes member functions for manipulating the encapsulated data. Thus, the difference between blocks 200 and 202 is that each record A, B, or C in block 200 is represented by a DPO in block 202, and the hierarchy in block 200 is represented by the collections of object collections in block 202.

Datastore Collection

The bridge 110 manages "datastore collections", which are the foundation of the "collections of object collections" data model. The members of the datastore collection are the DPOs. The datastore collection also includes a query evaluator having a query syntax and a query parser, a queryable datastore cursor, and an associated result collection with a cursor. For complex queries, queries may be sub-divided. Results for the queries are presented in user-specifiable increments, which permits the delivery of large result collections while controlling use of memory.

Figure 3:
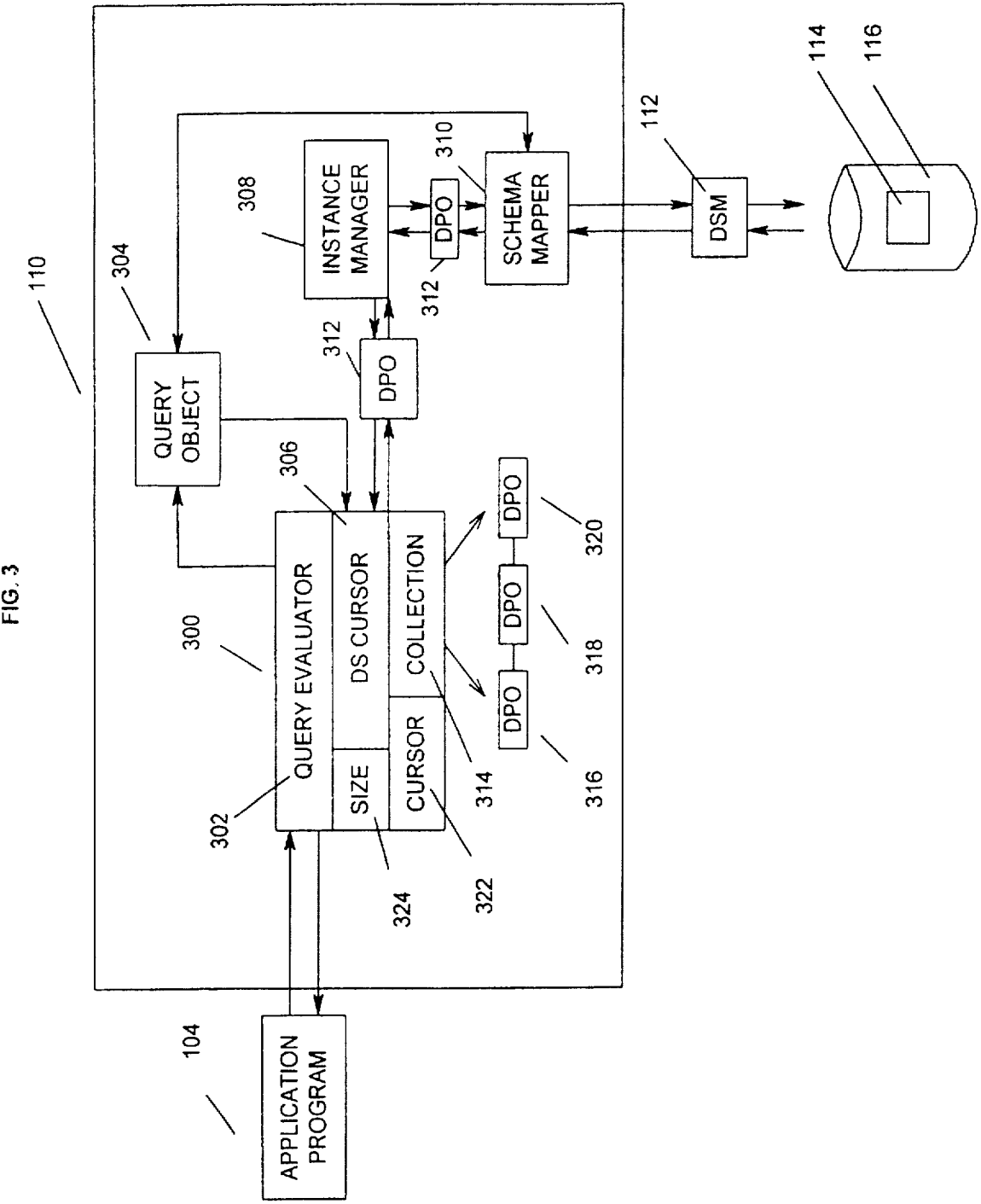
FIG. 3 is a block diagram illustrating an exemplary datastore collection of the bridge according to the present invention.

FIG. 3 is a block diagram illustrating an exemplary datastore collection 300 of the bridge 110 according to the present invention. The datastore collection 300 includes a query evaluator 302 for receiving a query from the application program 104, wherein the query evaluator 302 comprises a query syntax and a query parser. The query evaluator 302 parses the query request in accordance with the query syntax and stores the parsed request in a parse table in a query object 304. A datastore cursor 306 retrieves the parsed query from the query object 304 and provides the parsed query to an instance manager 308, which coordinates requests from the application program 104 with the datastore collection 300 and the external datastore 114. The instance manager 308 uses a schema mapper 310 to interface with the datastore manager 112. The datastore manager 112 retrieves data from the external datastore 114 on the external storage device 116 and returns the requested data to the schema mapper 310. The schema mapper 310 translates common elements between the requested data retrieved from the external datastore 114 and a DPO 312, which results in the requested data being encapsulated in the DPO 312. The schema mapper 310 returns the DPO 312 through the instance manager 308 to the datastore cursor 306 which stores the DPO 312 in the result collection 314. Generally, the result collection 314 comprises one or more DPOs 316, 318, and 320.

The datastore cursor 306 populates the result collection 314 so that the application program 104 can incrementally access the query result. Because the number of data items or records requested by the query may be large, the datastore cursor 306 only populates the result collection 314 with a specified number of DPOs 316, 318, and 320 that correspond to the query request. A pointer to the current DPOs 316, 318, or 320 is maintained by the cursor 322, and the size of the result collection 314 is determined by a size variable 324.

If the application program 104 needs to access more data items or records that satisfy the query, the datastore cursor 306 deletes one or more of the DPOs 316, 318, and 320 from the result collection 314 and requests the instance manager 308, through the schema mapper 310, to retrieve additional DPOs 312, up to the number indicated in the size variable 324, into the result collection 314.

In addition to populating a DPO 312 with data from the external datastore 114, the schema mapper 310 updates the external datastore 114 with changed data from the DPO 312. The schema mapper 310 may add data to the external datastore 114 when a new DPO 312 is created, and the schema mapper 310 may delete corresponding data from the external datastore 114 when a existing DPO 312 is deleted.

The schema mapper 310 translates queries to specific instructions for the datastore manager 112. Generally, these instructions comprise: SELECT, UPDATE, INSERT and DELETE, wherein the SELECT instruction retrieves data from the external datastore 114 via the datastore manager 112 for a DPO 312; the UPDATE instruction, following a SELECT, saves changed data from the DPO 312 into the external datastore 114 via the datastore manager 112; the INSERT instruction saves new data from the DPO 312 into the external datastore 114 via the datastore manager 112; and the DELETE instruction deletes the DPO 312 and its corresponding data from the external datastore 114 via the datastore manager 112.

Datastore Persistent Objects (DPOs)

The members, or elements, of the datastore collection 300 are queryable DPOs 316, 318, and 320 that encapsulate external data, i.e., records retrieved from the external datastore 114, with associated methods to move data with data type integrity between the DPOs 316, 318, and 320, and the records of the external datastore 114. Thus, a DPO 316, 318, and 320 makes non-object-oriented data accessible as "base class objects" that may be used or wrappered by other classes in an object-oriented programming system. Further, the data being encapsulated by the DPO 316, 318, and 320 may or may not be concurrently shared or updated between object-oriented and non-object-oriented applications, depending on the characteristics of the underlying datastore 114.

The bridge 110 thus comprises a queryable persistence implementation that can be used to access data in non-object-oriented datastores 114. The bridge 110 provides a datastore persistent object class to wrapper data retrieved from the external datastore 114, a queryable persistent identifier (PID) used to specify information used to locate the data in the external datastore 114 needed to populate the particular DPO 312, and a schema mapper class used to obtain the required data from the external datastore 114 and translate or transfer it into the format of the particular DPO 312.

Figure 4:
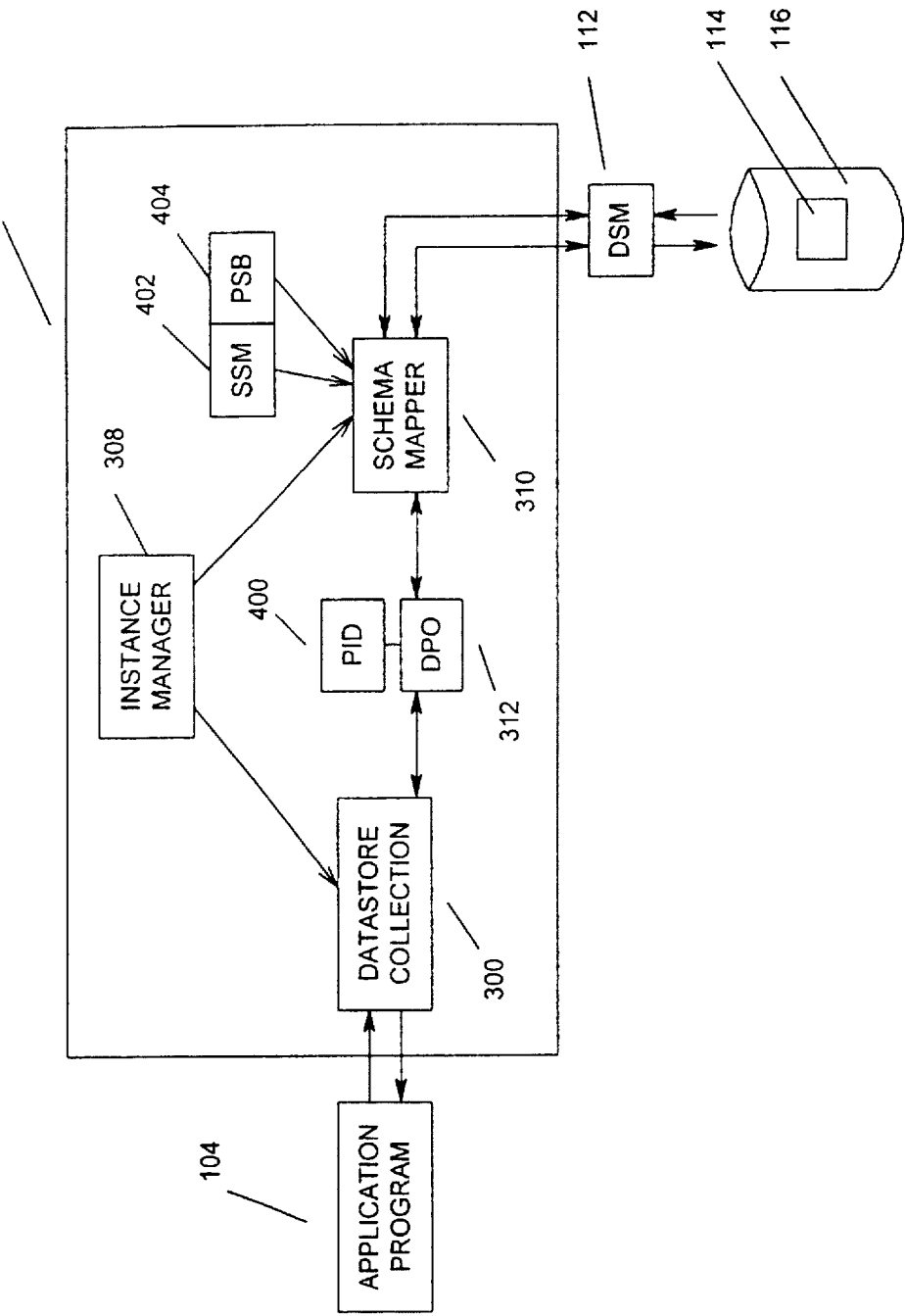
FIG. 4 is a block diagram illustrating the operation of the bridge according to the present invention.

FIG. 4 is a block diagram illustrating the operation of the bridge 110 according to the present invention. The application program 104 passes a query request to the datastore collection 300. The datastore collection 300 evaluates the query and passes control to the datastore cursor 306 for processing. The datastore cursor 306 creates a DPO 312 and its associated PID 400. The PID 400 is used to specify the query information needed to locate the data in the external datastore 114.

The DPO 312 and PID 400 are passed to the instance manager 308 who requests that the schema mapper 310 retrieve the data via the datastore manager 112 for storing into the DPO 312. The schema mapper 310 looks at the DPO's 312 accompanying PID 400 which has information from the query object 304 for locating data. The schema mapper 310 provides the input/output commands to the datastore manager 112 using information from a subschema mapper 402 and program specification block (PSB) 404. The schema mapper 310 receives the located logical unit of data from the datastore manager 112 and maps the located data into the DPO 312, thereby "wrappering" the logical unit of data. Upon completion of the operation, the DPO 312 then encapsulates the data retrieved by the schema mapper 310.

Instance Manager

Figure 5:
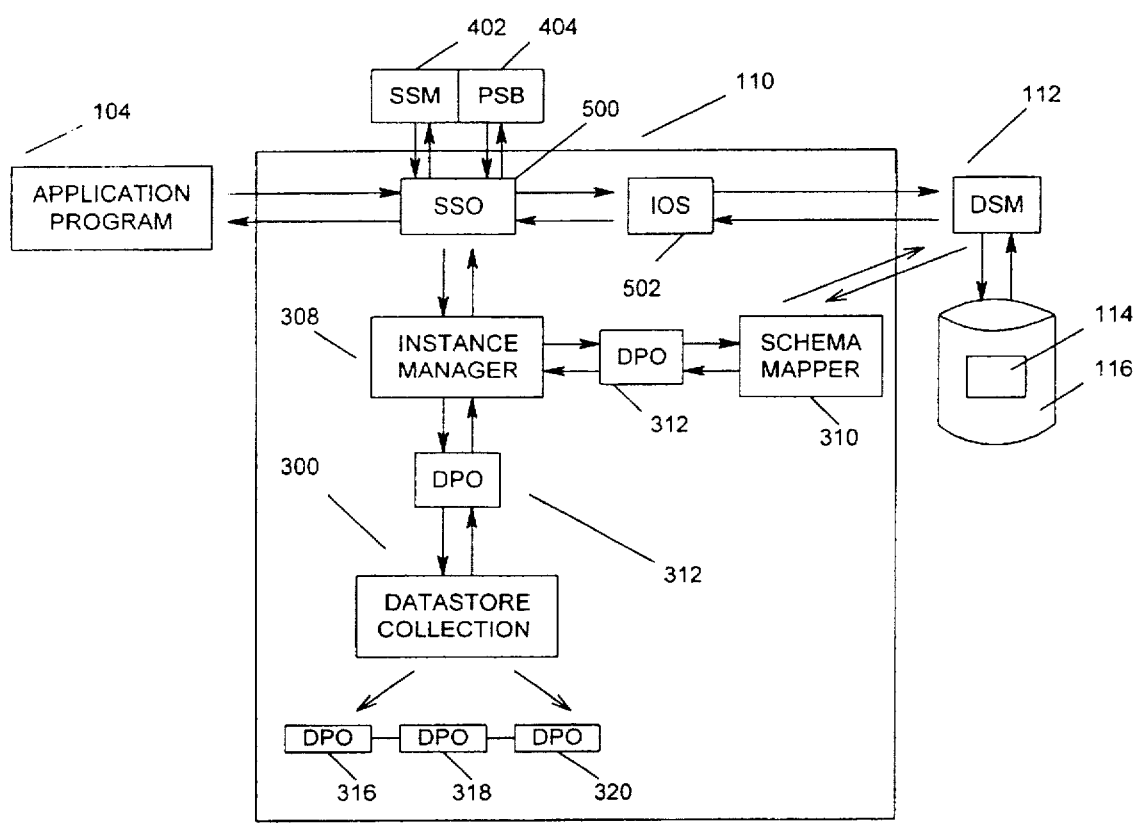
FIG. 5 is a block diagram illustrating the operation of the instance manager of the bridge according to the present invention.

FIG. 5 is a block diagram illustrating the operation of the instance manager 308 according to the present invention.

In the run-time environment, the datastore collections 300 and DPOs 316, 318, and 320 are managed (e.g., created, tracked, materialized, destroyed, and garbage collected) by the instance manager 308. The instance manager 308 also participates in the unit-of-work between the application program 104 being served and the external datastore 114.

Although the interface to the application program 104 remains constant, the level of service provided by the instance manager 308 will vary according to the characteristics of the external datastore 114. The instance manager 308 will exploit the capabilities of the external datastore 114 and the datastore manager 112 wherever possible, e.g., with regard to query functions, concurrency, security, etc.

The instance manager 308 uses service classes to isolate some of its functions, system services object (SSO) 500, interface object services (IOS) 502, and subschema mapper 402. The SSO 500 serves as a "factory" for creating DPO 312 and datastore collections 300 requested by query objects 304. The SSO 500 further serves as a transaction manager for the unit-of-work.

The SSO 500 receives a unit-of-work request from the application program 104. The SSO 500 creates a subschema mapper 402 and opens a PSB 404 for the unit-of-work request. The SSO 500 interfaces to the datastore manager 112 through the IOS 502. The IOS 502 opens and closes the connection to the datastore manager 112.

Using the schema mapper 310, the instance manager 308 populates the datastore collection 300 with DPOs 316, 318, and 320 that encapsulate data retrieved from the external datastore 114 via the datastore manager 112. The schema mapper 310 updates the external datastore 114 with changed data from the DPOs 316, 318, and 320, and adds or deletes the associated elements from the external datastore 114 when the DPOs 316, 318, and 320 are added or deleted.

The SSO 500 propagates a request to complete a unit-of-work to the instance manager 308, the datastore collection 300, the schema mapper 310, and the DPOs 316, 318, and 320, so as to coordinate the requests with the datastore manager 112 to maintain the integrity of the external datastore 114. Upon completion of the unit-of-work, the instance manager 308 deletes the DPOs 316, 318 and 320, the datastore collection 300, and schema mapper 310, from the memory of the server computer 102.

Datastore Class Definition Tool (CDT)

To minimize the need for writing non-object-oriented code to access the non-object-oriented datastore 114, the datastore persistent object classes and methods used in the present invention are generated by a Datastore Class Definition Tool (CDT). At run-time, the bridge 110 instantiates datastore persistent objects for these classes and directs the retrieval of data from the external datastore 114 into the datastore persistent objects.

Figure 6:
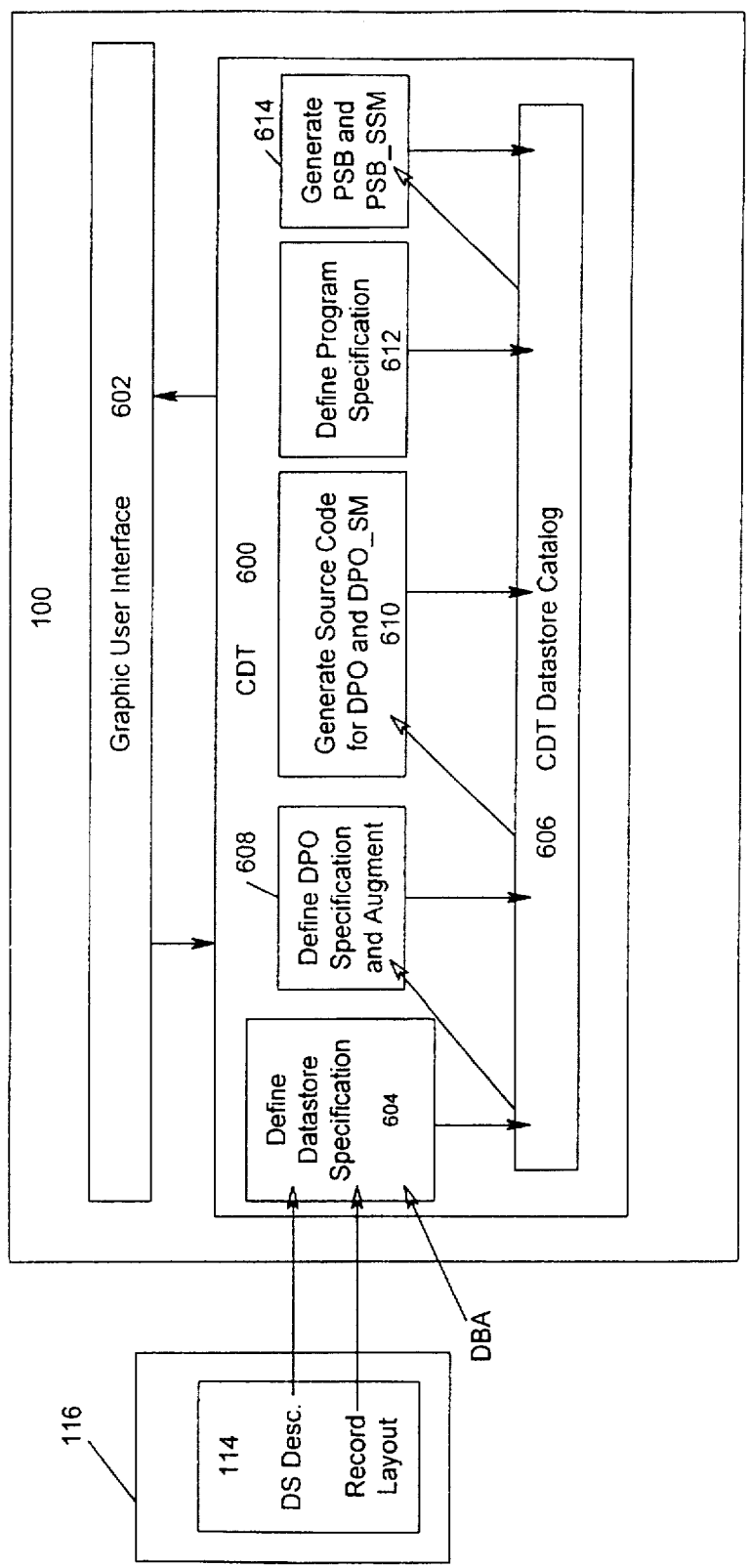
FIG. 6 is a block diagram illustrating the operation of the class definition tool according to the present invention.

FIG. 6 is a block diagram illustrating the operation of the CDT 600 according to the present invention. The CDT 600 executes under the control of the operating system 106 on the workstation 100 and interacts with an operator via a Graphical User interface (GUI) 602.

A define datastore specification function 604 of the CDT 600 captures information from a database description and the record layout, and associates them to one another to define a datastore specification stored in a CDT datastore catalog 606. The database description includes information about the structure of the segments in the external datastore 114 and the record layouts include formatting information for the records in the datastore 114. The database descriptions and record layouts accessed by the CDT 600 are typically located on the server computer 102.

The database description is derived from any source of information about a datastore, such as a database definition (DBD) in an IMS™ datastore, a VSAM™ file description, file definition source files, record definitions, source files, catalogs, repositories, or any other source of datastore information. These files generally define the datastore 114 in terms of size; structure, relationship, associations, data element size and type.

In the preferred embodiment, the record layout is captured from a COBOL "copylib" used by the application program 104. On the other hand, the record layout may also be captured from other languages, such as C, C++, Assembler, Pascal or PL/1, for example. Capturing a record layout involves parsing the "copylib" to extract field information, including position, type and length.

If the database description or the record layout changes, the define datastore specification function 604 may update the datastore specification stored in the catalog 606 in response to the change.

The define datastore specification function 604 that associates the database description with the record layout can either be done automatically by the CDT 600 or in response to a command from a Database Administrator (DBA). An example of automatic association would be the CDT 600 associating database description names with record layout names; alternatively, the DBA could manually enter such associations into the CDT 600. The resulting datastore specification contains the relevant information extracted from the database description and the record layout, and links the database description and record layout together.

The define datastore specification function 604 may further perform an augment function that captures additional information to assist in defining the datastore specification. Examples of this additional information are date formats, range of values, sets of values, trigger fields, null values, foreign keys, partial keys, optimistic locking indicators, required fields for insert, calculated fields, child/dependent datastore persistent objects, etc.

A define datastore persistent object specification function 608 of the CDT 600 uses the datastore specification in the CDT datastore catalog 606 and DBA input to define a datastore persistent object specification, which is then stored in the CDT datastore catalog 606. In the preferred embodiment, the define datastore persistent object specification function 608 of the CDT 600 performs functions of naming the datastore persistent object class, accepting operator input that describes the datastore persistent object class, and identifying characteristics of the datastore source, e.g., fields in a record or fields in a segment. The define datastore persistent object specification function 608 may further perform an augment function that captures additional information to assist in defining the datastore persistent object specification and to constrain the use of datastore persistent objects. Examples of this additional information are date formats, range of values, sets of values, trigger fields, null values, foreign keys, partial keys, optimistic locking indicators, required fields for insert, calculated fields, child/dependent datastore persistent objects, etc.

A generate datastore persistent object specification source code function 610 of the CDT 600 uses the datastore persistent object specification to generate source code for the datastore persistent class and its associated schema mapper class. The source code includes both class definitions and method implementations for the classes. The code generated by the CDT 600 is compiled, linked, and made available in executable form at run-time.

The define program specification function 612 of the CDT 600 captures characteristics of the object-oriented application program 104 to be executed on the workstation 100 as a program specification, which is stored in the CDT datastore catalog 606. The define program specification function 612 provides information about the object-oriented application program 104 that is useful in generating subschema mapper class definition and method source code and PSB source code. The define program specification function 612 of the CDT 600 may further perform an augment function that captures additional information to assist in defining the program specification. In the preferred embodiment, the define program specification function 612 performs the functions of identifying the object-oriented application program 104, providing descriptive text about the object-oriented application program 104, identifying the datastore persistent objects used by the object-oriented application program 104, and capturing characteristics related to the use of the datastore persistent objects (e.g., whether concurrent access to objects is required, whether the application program will update and delete objects, etc.) by the application program 104.

The generate program specification source code function 614 of the CDT 600 generates source code for PSBs and paired subschema mapper class definitions and methods. The code generated by the CDT 600 is compiled, linked, and made available in executable form at run-time. Generally, the PSBs are macro-assembler statements, e.g., System/360 assembler language for IMS™ datastores 114, that define the datastores 114 and segments accessible to application programs 104.

As is known in the art, a PSB comprises one or more program control blocks (PCB) for an IMS™ datastore 114. A PCB is a control statement that names the IMS™ datastore 114 being accessed and the processing options. More specifically, the PCB enumerates the segment names that may be accessed and their processing options.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. In addition, the present invention could be used to model other types of information.

In summary, the present invention discloses a method, apparatus, and article of manufacture for cataloging datastore characteristics and defining and generating datastore persistent objects. A computerized system in accordance with the principles of the present invention includes an external non-object-oriented datastore and a class definition tool that defines and stores a specification for the external non-object-oriented datastore, a specification for a datastore persistent object class using the specification for the external non-object-oriented datastore, and a specification for an application program that interacts with the datastore persistent object class. The class definition tool further generates datastore persistent object class, schema mapper class, and subschema mapper class definition and method source code.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for cataloging datastore characteristics and defining and generating datastore persistent objects, comprising the steps of:

defining a specification in a memory of a computer for an external non-object-oriented datastore stored on a data storage device attached to a computer;

defining a specification in the memory of the computer for a datastore persistent object class using the specification of the external non-object-oriented datastore; and defining a specification in the memory of the computer for an application program that interacts with the datastore persistent object class.

2. The method of claim 1, further comprising storing the datastore specification in a catalog on a data storage device attached to a computer.

3. The method of claim 1, further comprising storing the datastore persistent object class specification in a catalog on a data storage device attached to a computer.

4. The method of claim 1, further comprising storing the application program specification in a catalog on a data storage device attached to a computer.

5. The method of claim 1, further comprising generating datastore persistent object class and schema mapper class definition and method source code using the datastore persistent object class specification.

6. The method of claim 1, further comprising generating subschema mapper class definition and method source code using the application program specification.

7. The method of claim 6, further comprising generating program specification block code using the application program specification.

8. The method of claim 1, the defining the datastore specification step comprising the steps of:

capturing a database description associated with the external non-object-oriented datastore;

capturing a record layout associated with the external non-object-oriented datastore;

associating the database description with the record layout in a memory of a computer to define the datastore specification; and augmenting the datastore specification to constrain use of the external non-object-oriented datastore by datastore persistent objects.

9. The method of claim 8, the associating step comprising the step of automatically associating the database description with the record layout to define the datastore specification.

10. The method of claim 8, the associating step comprising the step of accepting a command from an operator to associate the database description with the record layout to define the datastore specification.

11. The method of claim 8, further comprising updating the datastore specification in response to a change in the database description.

12. The method of claim 8, further comprising updating the datastore specification in response to a change in the record layout.

13. The method of claim 1, the defining the datastore persistent object class specification step comprising the steps of:

naming the datastore persistent object class;

accepting operator input into the computer that describes the datastore persistent object class;

identifying characteristics of the external non-object-oriented datastore; and augmenting the datastore persistent object class specification to constrain use of the external non-object-oriented datastore by the datastore persistent objects.

14. The method of claim 1, the defining the application program specification step comprising the steps of:

identifying an application program;

identifying datastore persistent objects used by the application program;

capturing characteristics related to use of the datastore persistent objects by the application program; and augmenting the application program specification to constrain use of a datastore persistent object by the application program.

15. A computerized apparatus for cataloging datastore characteristics and defining and generating datastore persistent objects, comprising:

an external non-object-oriented datastore stored on a data storage device attached to a computer; and a class definition tool, executed by a computer, for defining a specification in a memory of the computer for the external non-object-oriented datastore, for defining a specification for a datastore persistent object class in the memory of the computer using the specification of the external non-object-oriented datastore, and for defining a specification for an application program in the memory of the computer that interacts with the datastore persistent object class.

16. The apparatus of claim 15, the class definition tool comprising:

means, performed by the computer, for storing the data store specification in a catalog on a data storage device attached to a computer.

17. The apparatus of claim 15, the class definition tool comprising:

means, performed by the computer, for storing the datastore persistent object class specification in a catalog on a data storage device attached to a computer.

18. The apparatus of claim 15, the class definition tool comprising:

means, performed by the computer, for storing the application program specification in a catalog on a data storage device attached to a computer.

19. The apparatus of claim 15, the class definition tool comprising:

means, performed by the computer, for generating datastore persistent object class and schema mapper class definition and method source code using the datastore persistent object class specification.

20. The apparatus of claim 15, the class definition tool comprising:

means, performed by the computer, for generating subschema mapper class definition and method source code using the application program specification.

21. The apparatus of claim 15, the class definition tool comprising:

means, performed by the computer, for generating program specification block code using the application program specification.

22. The apparatus of claim 15, the class definition tool further comprising:

means, performed by the computer, for capturing a database description associated with the external non-object-oriented datastore;

means, performed by the computer, for capturing a record layout associated with the external non-object-oriented datastore;

means, performed by the computer, for associating the database description with the record layout to define the datastore specification; and means, performed by the computer, for augmenting the datastore specification to constrain use of the external non-object-oriented datastore by datastore persistent objects.

23. The apparatus of claim 22, the associating means comprising means, performed by the computer, for automatically associating the database description with the record layout to define the datastore specification.

24. The apparatus of claim 22, the associating means comprising means, performed by the computer, for accepting a command from an operator to associate the database description with the record layout to define the datastore specification.

25. The apparatus of claim 22, further comprising means, performed by the computer, for updating the datastore specification in response to a change in the database description.

26. The apparatus of claim 22, further comprising means, performed by the computer, for updating the datastore specification in response to a change in the record layout.

27. The apparatus of claim 15, the class definition tool further comprising:
- means, performed by the computer, for naming the datastore persistent object class;
- means, performed by the computer, for accepting operator input into the computer that describes the datastore persistent object class;
- means, performed by the computer, for identifying characteristics of the external non-object-oriented datastore; and
- means, performed by the computer, for augmenting the datastore persistent object class specification to constrain use of the external non-object-oriented datastore by the datastore persistent objects.

28. The apparatus of claim 15, the class definition tool further comprising:
- means, performed by the computer, for identifying an application program;
- means, performed by the computer, for identifying datastore persistent objects used by the application program;
- means, performed by the computer, for capturing characteristics related to use of the datastore persistent objects by the application program; and
- means, performed by the computer, for augmenting the application program specification to constrain use of a datastore persistent object by the application program.

29. A program storage medium readable by a computer having a memory, the medium tangibly embodying one or more programs of instructions executable by the computer to perform method steps for cataloging datastore characteristics and defining and generating datastore persistent objects, the method comprising the steps of:
- defining a specification in a memory of a computer for an external non-object-oriented datastore stored on a data storage device attached to a computer;
- defining a specification in the memory of the computer for a datastore persistent object class using the specification of the external non-object-oriented datastore; and
- defining a specification in the memory of the computer for an application program that interacts with the datastore persistent object class.

30. The program storage medium of claim 29, the method further comprising storing the datastore specification in a catalog on a data storage device attached to a computer.

31. The program storage medium of claim 29, the method further comprising storing the datastore persistent object class specification in a catalog on a data storage device attached to a computer.

32. The program storage medium of claim 29, the method further comprising storing the application program specification in a catalog on a data storage device attached to a computer.

33. The program storage medium of claim 29, the method further comprising generating datastore persistent object class and schema mapper class definition and method source code using the datastore persistent object class specification.

34. The program storage medium of claim 29, the method further comprising generating subschema mapper class definition and method source code using the application program specification.

35. The program storage medium of claim 34, the method further comprising generating program specification block code using the application program specification.

36. The program storage medium of claim 29, the defining the datastore specification step comprising the steps of:
- capturing a database description associated with the external non-object-oriented datastore;
- capturing a record layout associated with the external non-object-oriented datastore;
- associating the database description with the record layout to define the datastore specification; and
- augmenting the datastore specification to constrain use of the external non-object-oriented datastore by datastore persistent objects.

37. The program storage medium of claim 36, the associating step comprising the step of automatically associating the database description with the record layout to define the datastore specification.

38. The program storage medium of claim 36, the associating step comprising the step of accepting a command from an operator to associate the database description with the record layout to define the datastore specification.

39. The program storage medium of claim 36, the method further comprising updating the datastore specification in response to a change in the database description.

40. The program storage medium of claim 36, the method further comprising updating the datastore specification in response to a change in the record layout.

41. The program storage medium of claim 29, the defining the datastore persistent object class specification step comprising the steps of:
- naming the datastore persistent object class;
- accepting operator input into the computer that describes the datastore persistent object class;
- identifying characteristics of the external non-object-oriented datastore; and
- augmenting the datastore persistent object class specification to constrain use of the external non-object-oriented datastore by the datastore persistent objects.

42. The program storage medium of claim 29, the defining the application program specification step comprising the steps of:
- identifying an application program;
- identifying datastore persistent objects used by the application program;
- capturing characteristics related to use of the datastore persistent objects by the application program; and
- augmenting the application program specification to constrain use of a datastore persistent object by the application program.

* * * * *

UNITED STATES PATENT AND TRADEMARK OFFICE
CERTIFICATE OF CORRECTION

PATENT NO. : 5,737,597

DATED : April 7, 1998

INVENTOR(S) : Kenneth R. Blackman and Jack L. Howe III

It is certified that error appears in the above-identified patent and that said Letters Patent is hereby corrected as shown below:

Column 2, after line 7, insert --application Ser. No. 08/736,922, entitled "A METHOD FOR CAPTURING AND CATALOGING DATASTORE CHARACTERISTICS TO DEFINE DATASTORE PERSISTENT OBJECTS," filed on same date herewith, by Kenneth R. Blackman and Jack L. Howe III;--

Column 4, line 51, before "computer" insert --more--.

Column 8, line 44, after "size" change the colon (:) to a comma (--,--).

Signed and Sealed this

Eighth Day of September, 1998

*Attest:*

BRUCE LEHMAN

*Attesting Officer*  *Commissioner of Patents and Trademarks*